(No Model.) 2 Sheets—Sheet 1.
C. T. REDFIELD.
SAW.
No. 559,309. Patented Apr. 28, 1896.
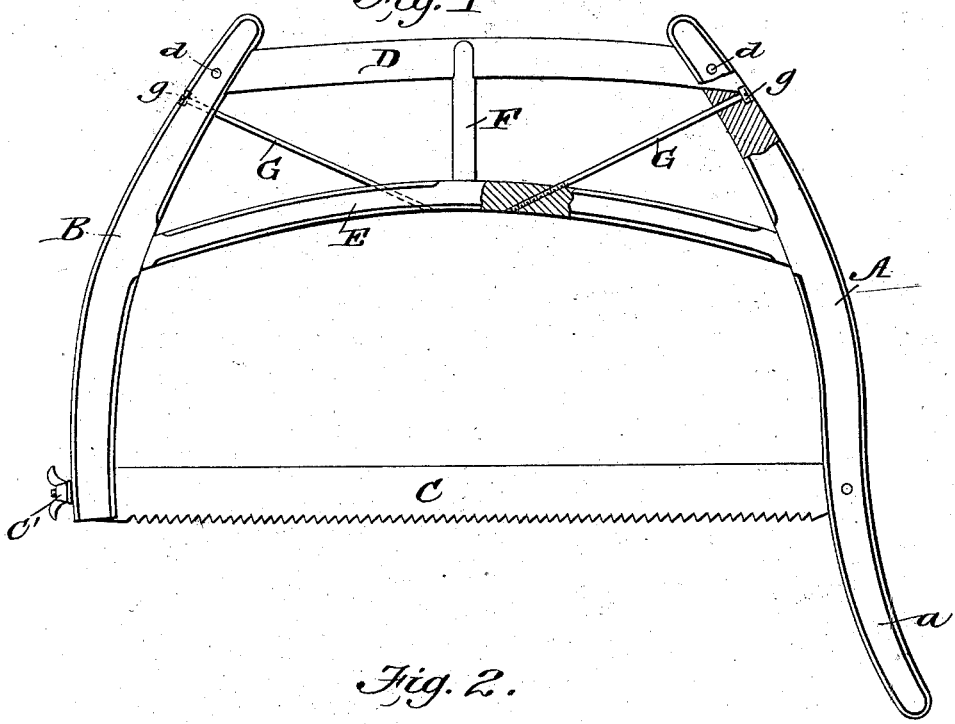
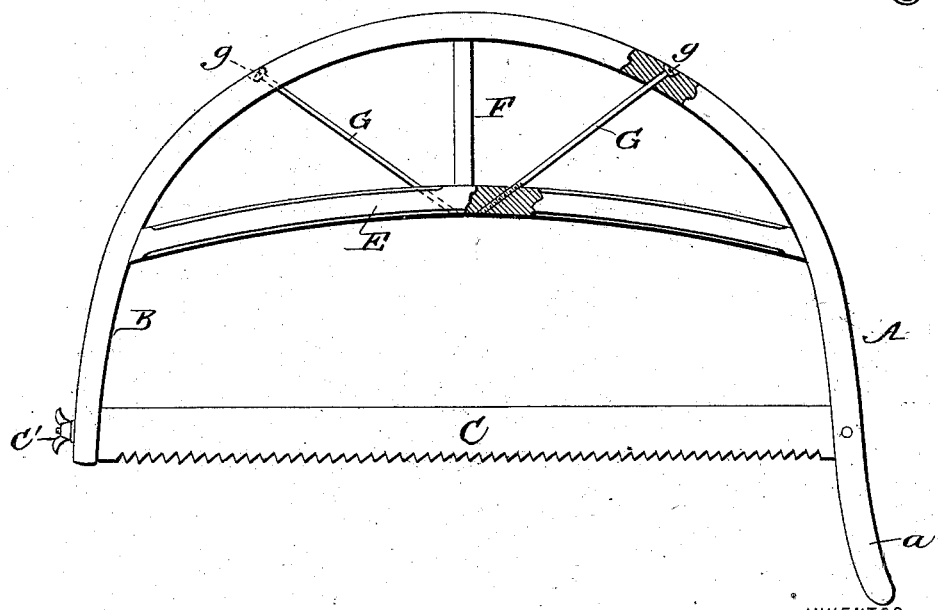
WITNESSES:
INVENTOR
Charles T. Redfield.
BY
ATTORNEYS.

(No Model.) 2 Sheets—Sheet 2.
C. T. REDFIELD.
SAW.
No. 559,309. Patented Apr. 28, 1896.
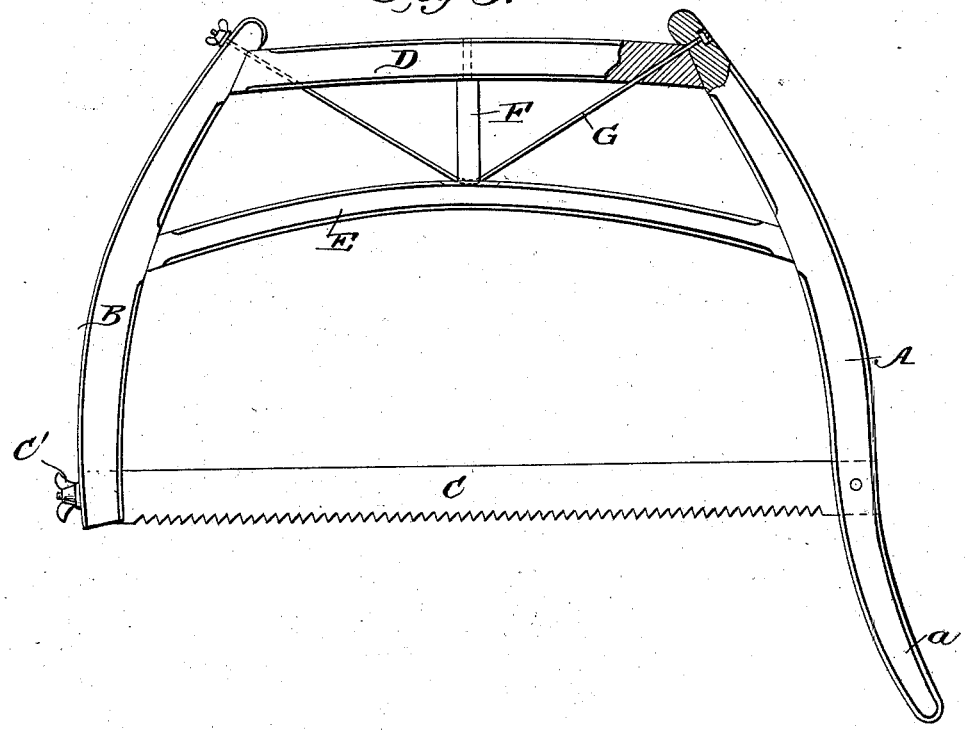
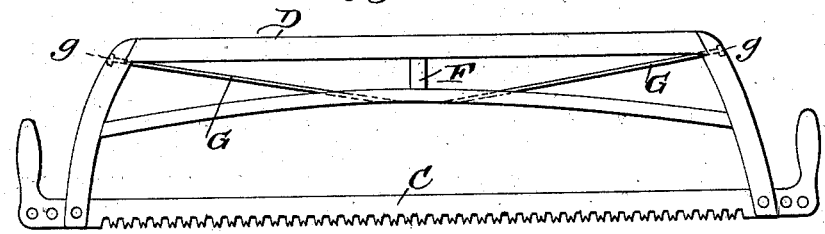
WITNESSES:
M. S. Bloudel
P. B. Turpin
INVENTOR
Charles T. Redfield.
BY Munn & Co.
ATTORNEYS.

UNITED STATES PATENT OFFICE.

CHARLES T. REDFIELD, OF GLEN HAVEN, NEW YORK.

SAW.

SPECIFICATION forming part of Letters Patent No. 559,309, dated April 28, 1896.

Application filed February 15, 1896. Serial No. 579,405. (No model.)

*To all whom it may concern:*

Be it known that I, CHARLES T. REDFIELD, residing at Glen Haven, in the county of Cayuga and State of New York, have invented certain new and useful Improvements in Saws, of which the following is a specification.

This invention is an improvement in saws, and particularly in the frame for supporting the saw-blade, and has for an object, among other improvements, to provide means whereby to truss the saw-frame and to furnish a tensile strain between the middle portion of the cross-bar and the upper ends of the end bars of the frame, by which a drawing strain may be exerted between such cross-bar and the upper portion of the end bars to produce a trussing of the saw-frame in such manner as to prevent the cross-bar from moving out laterally under the strain exerted in tightening the saw-blade.

The invention consists in certain novel constructions and combinations of parts, as will be hereinafter described, and pointed out in the claims.

In the drawings, Figure 1 is a side view of a saw provided with my improvement, parts being broken away and others shown in section. Fig. 2 is a side view of a saw in which the top bar is integral with the end bars. Fig. 3 is a side view, partly in section, showing a somewhat different arrangement of the truss-rod. Fig. 4 shows the application of the invention to crosscut drag-saws.

My saw is formed with the end bars A and B, the bar A being extended at *a*, as usual, to form a handle. The saw-blade C is secured at one end to the end bar A, extends at its other end through the end bar B, and is provided with a thumb-nut C', the saw and thumb-nut constituting means by which the lower ends of the end bars may be strained together or toward each other in tightening the saw. The end bars are connected at their upper ends, it may be, by forming the top bar integral with the end bars, as shown in Fig. 2, or it may be accomplished by using a separate top bar, as shown in Figs. 1 and 3, such separate top bar D being secured to the upper ends of the end bars by pins *d* or in other suitable manner to form a rigid connection with the upper ends of the end bars. Below the top bar I provide the cross-bar E, mortised at its ends in the end bars and braced from the top bar by an intermediate post F, arranged midway between the end bars. Truss-rods are provided and arranged diagonally between the upper portions of the end bars and the middle portion of the cross-bar and are so arranged and constructed as to exert a drawing tension upon the said cross-bar, operating to truss the saw-frame and also to hold the cross-bar from carrying out or from bending laterally from the strain exerted in tightening the saw.

In Fig. 1 the truss-rods G are passed through the end bars near the upper ends of the latter, extend thence downward and inward at an incline, and have their inner lower ends threaded in connection with the cross-bar at about the middle of the latter, said threaded connection being preferably effected by providing the rods G with threaded points, heads *g* being provided at the upper outer ends of the rods, by which they may be turned.

In Fig. 1 the rods G are separate and independent and may be operated each independent of the other, while in Fig. 3 I show the truss-rods integral and extending from the upper end of one end bar to the middle of the cross-bar and thence upward to the upper end of the other end bar, where it receives a nut by which it may be operated to exert tensile strain as desired in order to prevent the lateral displacement of the cross-bar.

In Fig. 4 I show the application of the invention to a crosscut drag-saw, and it is manifest that in such connection it will enable the use of a much lighter and thinner saw than is practicable with the ordinary crosscut-saw.

Now it should be understood that my truss-rods are more than diagonal braces between the cross-bar and the upper portions of the end bars, for in addition to resisting any upward movement of the cross-bar they may be adjusted to exert a tensile strain upon the middle portion of said cross-bar and so prevent any lateral displacement of said cross-bar and operate to retain the same in the true plane of the saw-frame.

In operation the straining of the saw draws the lower ends of the end bars toward each other, and such end bars fulcruming upon the opposite ends of the cross-bar are given an outward tendency at their upper ends which is resisted by the top bar and is also resisted by the tensile strain exerted by the truss-rods G, the whole coöperating in securing a saw-frame which is rigid in all directions, is capable of standing up properly under the greatest strain upon the saw-blade, and in which the cross-bar is held by the truss-rods from carrying out or moving laterally out of the plane of the saw, the truss-rods which prevent the lateral displacement of the cross-bar also operating by their tensile strain to bind the upper ends of the end bars tightly in connection with the top bar and establish and maintain a firm union between the middle portion of the cross-bar and the ends of the end bars and of the top bars.

The truss-rods when screwed down, the top bar being firmly secured at its ends, complete a solid truss-frame with tensile strain all the way around, holding the tenons of the cross-bar firmly in the mortises of the end bars. The rods can also be adjusted in connection with the straining of the saw-blade to produce rigidity of the frame to prevent the end bars from breaking above the cross-bar and to permit the straining of the frame to any desired degree without permitting the cross-bar to carry out or move to either side. When the said blade is removed for filing or to insert another saw, or for any other purpose, the frame remains intact.

Having thus described my invention, what I claim, and desire to secure by Letters Patent, is—

1. The improved saw herein described consisting of the end bars, means by which the lower ends of such bars may be strained toward each other, the top bar made fast to and extending between the upper ends of the end bars, the cross-bar extending between the end bars at a point below the top bar, the post arranged between the cross-bar and the top bar, and the truss-rods passed through the end bars near the upper ends thereof extended thence diagonally downward and inward and threaded at their inner ends into connection with the cross-bar at about the middle of the latter whereby they may be caused to exert a drawing tension upon said cross-bar, substantially as and for the purpose set forth.

2. The saw herein described comprising the end bars, the top bar connecting said end bars, the cross-bar extending between the end bars at a point below the top bar, the post arranged between the cross-bar and the top bar, and the truss-rods extending diagonally between the upper ends of the opposite end bars and the middle portion of the cross-bar and adapted to exert a drawing tension whereby the frame is trussed and the cross-bar is held from lateral displacement substantially as described and shown.

CHARLES T. REDFIELD.

Witnesses:
P. B. TURPIN,
SOLON C. KEMON.